United States Patent
Hampton et al.

(10) Patent No.: US 11,614,138 B2
(45) Date of Patent: Mar. 28, 2023

(54) ANTI-RECOIL ASSEMBLY HAVING ENERGY ATTENUATOR COUPLED TO A MOVABLE SHAFT, AND EJECTION SEAT STABILITY SYSTEM INCLUDING THE SAME

(71) Applicant: AMI Industries, Inc., Colorado Springs, CO (US)

(72) Inventors: John Hampton, Colorado Springs, CO (US); Kassidy L. Carson, Colorado Springs, CO (US); Ryan Roseke, Colorado Springs, CO (US)

(73) Assignee: AMI Industries, Inc., Colorado Springs, CO (US)

( * ) Notice: Subject to any disclaimer, the term of this patent is extended or adjusted under 35 U.S.C. 154(b) by 267 days.

(21) Appl. No.: 17/076,276

(22) Filed: Oct. 21, 2020

(65) Prior Publication Data

US 2022/0120327 A1 Apr. 21, 2022

(51) Int. Cl.
| | | |
|---|---|---|
| B64D 25/10 | (2006.01) | |
| F16F 7/00 | (2006.01) | |
| F16F 7/12 | (2006.01) | |

(52) U.S. Cl.
CPC .............. F16F 7/003 (2013.01); B64D 25/10 (2013.01); F16F 7/12 (2013.01)

(58) Field of Classification Search
CPC .................................................. B64D 25/10
See application file for complete search history.

(56) References Cited

U.S. PATENT DOCUMENTS

| | | | |
|---|---|---|---|
| 2,736,236 A | | 2/1956 | Martin |
| 3,354,990 A | * | 11/1967 | Stahl .......................... F16F 7/12 |
| | | | 188/375 |
| 3,362,662 A | | 1/1968 | McIntyre et al. |
| 3,487,445 A | | 12/1969 | Gluhareff et al. |
| 4,396,171 A | | 8/1983 | Schultz |
| 9,435,602 B1 | | 9/2016 | Matthew et al. |
| 2012/0137870 A1 | | 6/2012 | Timothey et al. |
| 2019/0195310 A1 | * | 6/2019 | Carroccia ............... F16F 7/125 |

FOREIGN PATENT DOCUMENTS

GB    2253597    9/1992

OTHER PUBLICATIONS

United Kingdom Intellectual Property Office, United Kingdom Search Report dated May 5, 2022 in Application No. GB2114011.6.

\* cited by examiner

*Primary Examiner* — Brady W Frazier
*Assistant Examiner* — Shanna Danielle Glover
(74) *Attorney, Agent, or Firm* — Snell & Wilmer L.L.P.

(57) ABSTRACT

An anti-recoil assembly may include a housing, a shaft, and an energy attenuator. The housing generally defines a cavity, with the housing having a first end portion and a second end portion, according to various embodiments. The shaft may be at least partially disposed within the cavity, and the shaft may be configured to move within the cavity in a first direction from the first end portion to the second end portion. In various embodiments, the energy attenuator is disposed within the cavity at the second end portion. In response to movement of the shaft in the first direction, the energy attenuator is configured to inhibit the shaft from recoiling in a second direction opposite the first direction, according to various embodiments.

18 Claims, 7 Drawing Sheets

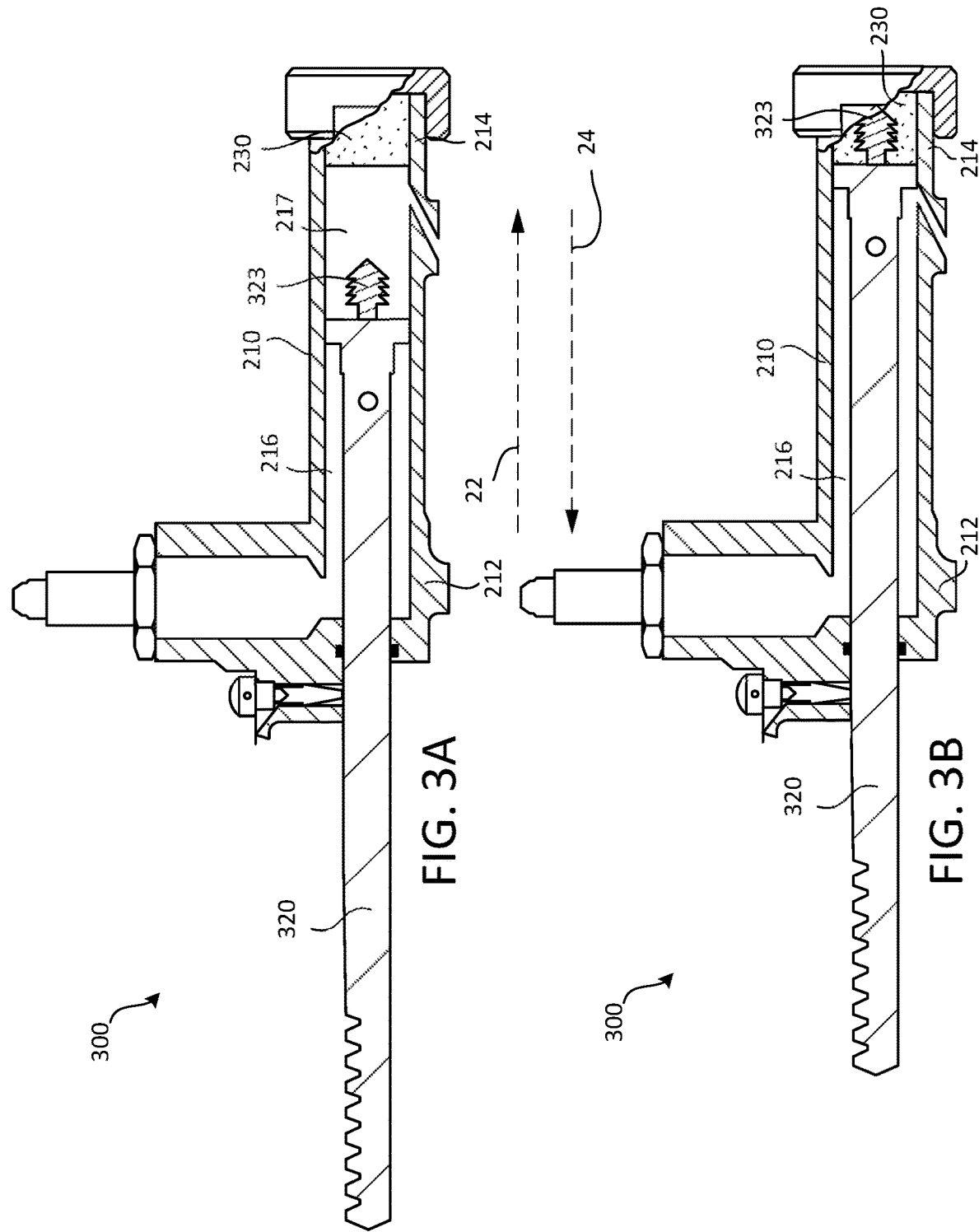

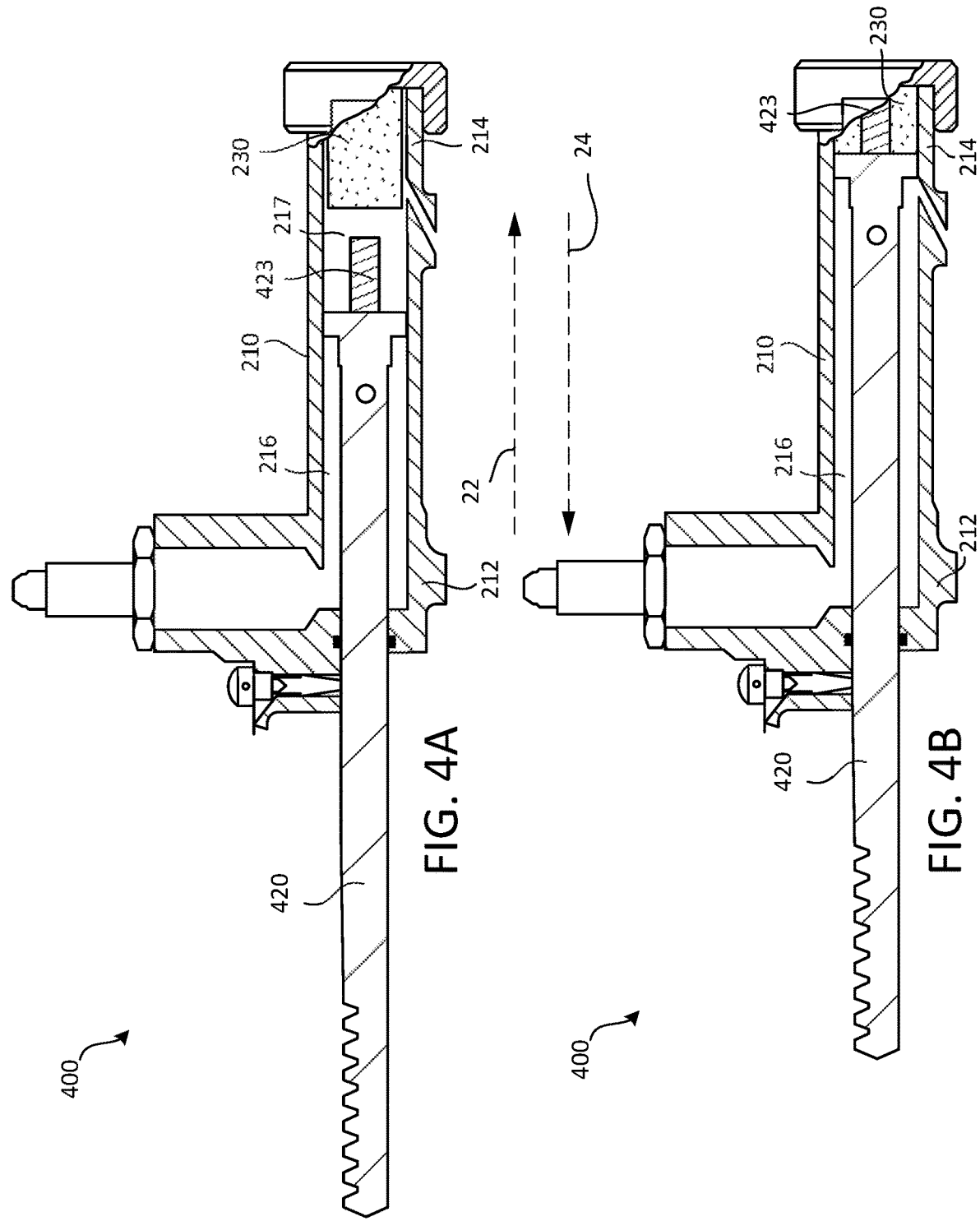

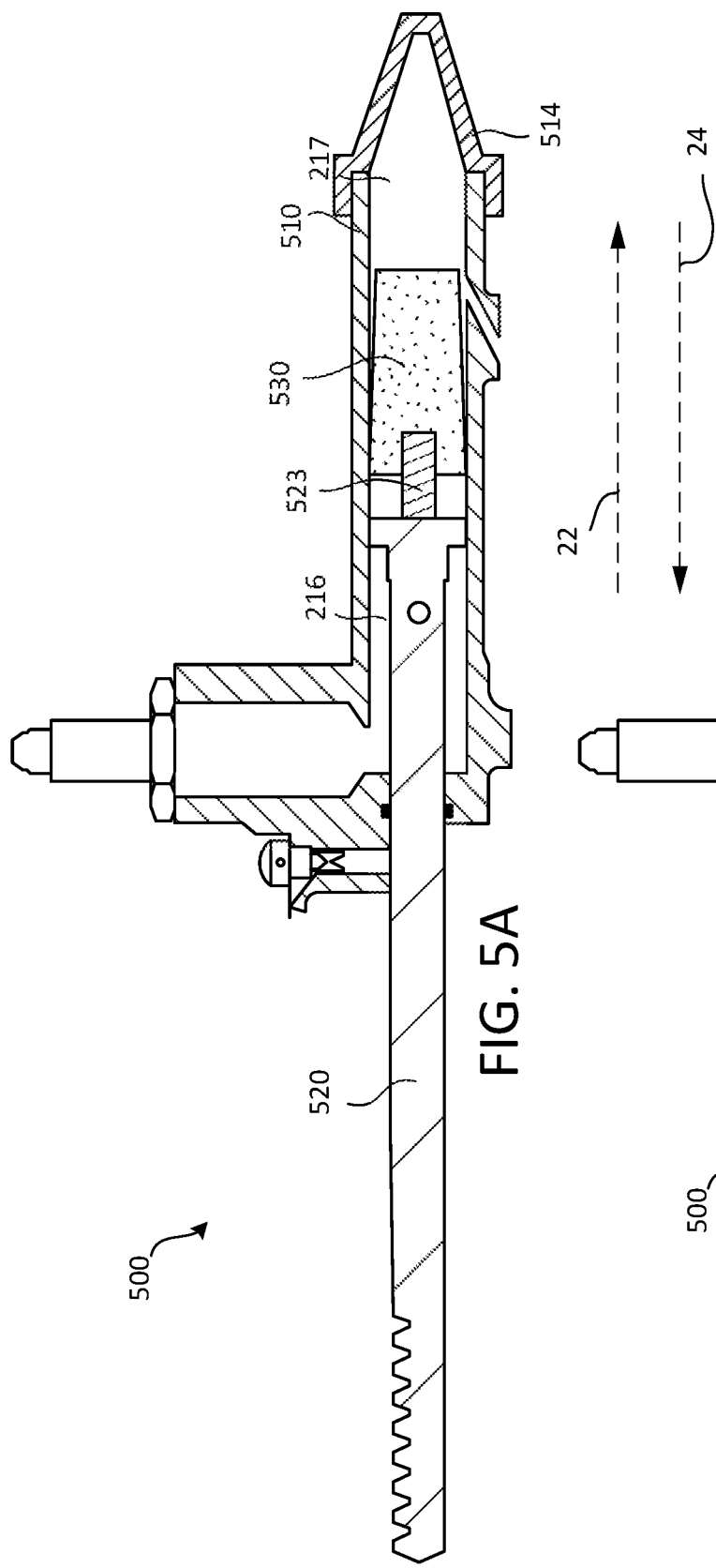
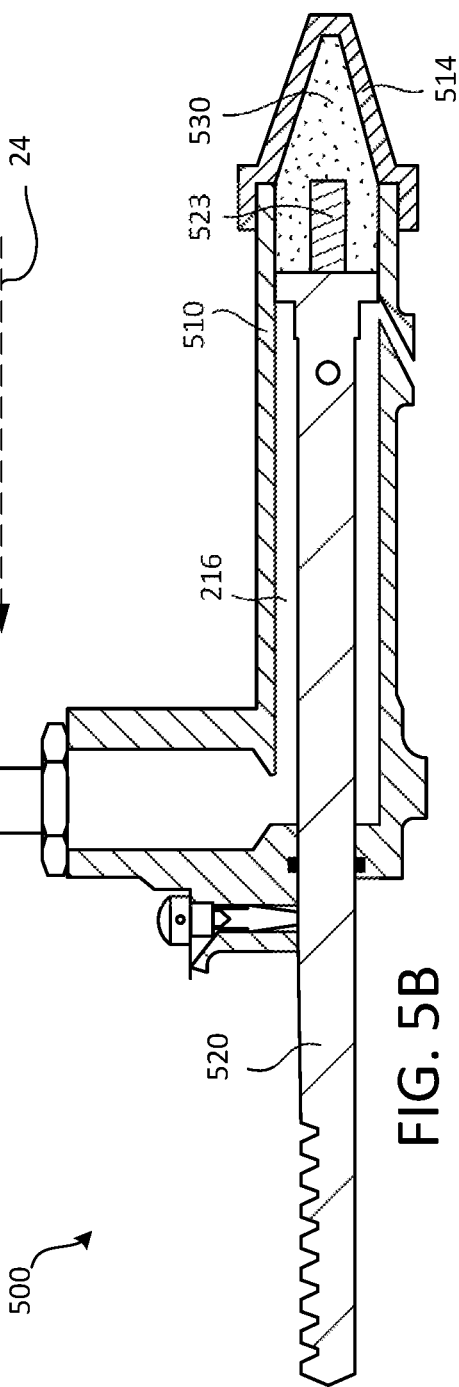

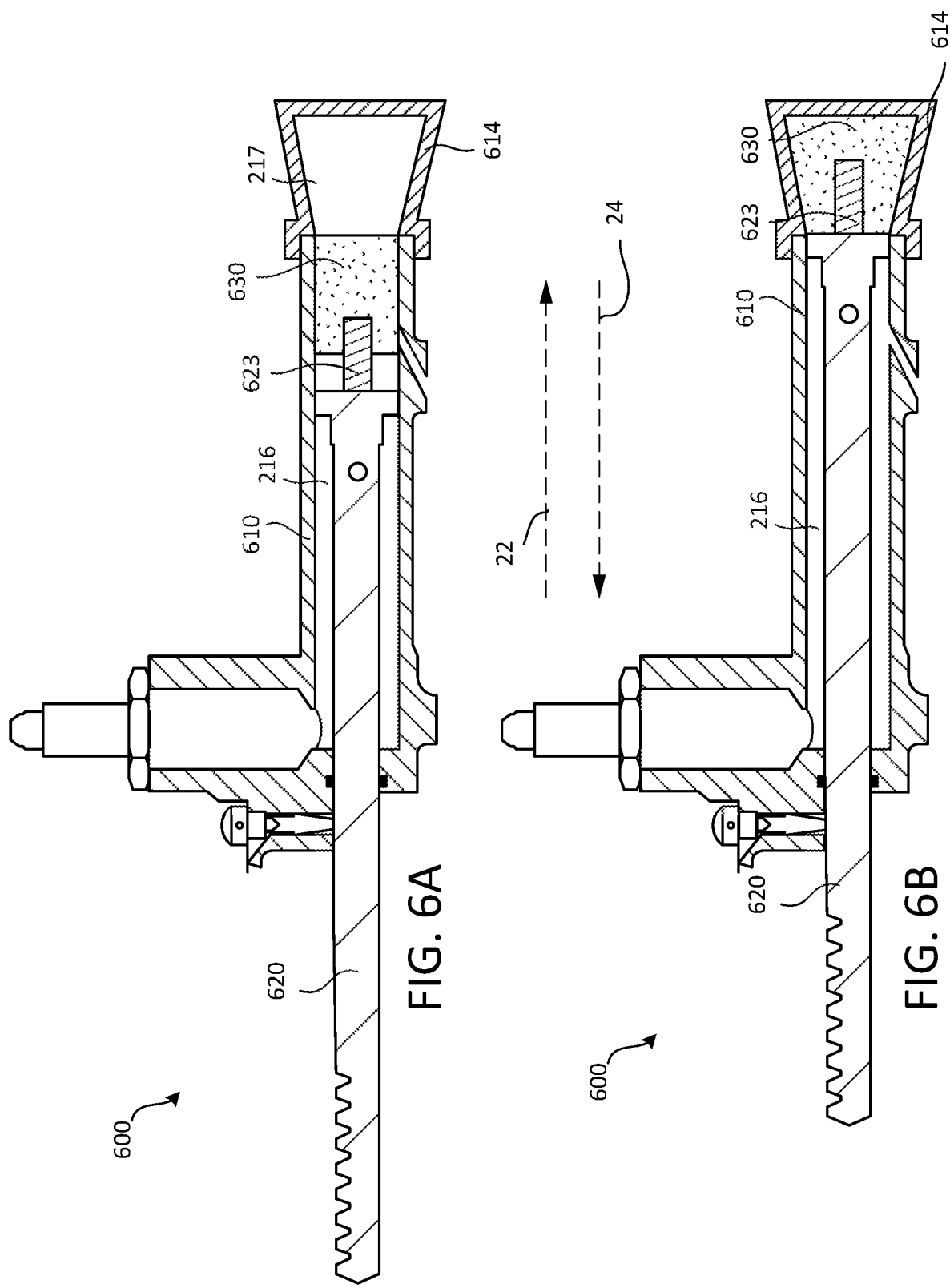

ANTI-RECOIL ASSEMBLY HAVING ENERGY ATTENUATOR COUPLED TO A MOVABLE SHAFT, AND EJECTION SEAT STABILITY SYSTEM INCLUDING THE SAME

FIELD

The present disclosure relates to an anti-recoil assembly, and in particular to inhibiting shaft recoil in an ejection seat stability system.

BACKGROUND

Various aircraft include one or more ejection seats configured to eject a pilot or other occupant from the aircraft during an emergency. To stabilize the ejection seat during an ejection event, ejection seat stability systems are often incorporated into the ejection seat. Such systems generally utilize a shaft to drive rotation of a gyro, which provides stability to the ejection seat during ejection. However, shafts of conventional stability systems can be susceptible to recoil. That is, the shaft may spin up the gyro but then may recoil back into engagement with the gyro, thus damaging the associated components and/or compromising the ability of the gyro to provide stability to the ejection seat.

SUMMARY

In various embodiments, the present disclosure provides an anti-recoil assembly. The anti-recoil assembly may include a housing, a shaft, and an energy attenuator. The housing generally defines a cavity, with the housing having a first end portion and a second end portion, according to various embodiments. The shaft may be at least partially disposed within the cavity, and the shaft may be configured to move within the cavity in a first direction from the first end portion to the second end portion. In various embodiments, the energy attenuator is disposed within the cavity at the second end portion. In response to movement of the shaft in the first direction, the energy attenuator is configured to inhibit the shaft from recoiling in a second direction opposite the first direction, according to various embodiments.

In various embodiments, in response to the movement of the shaft in the first direction, at least an end section of the shaft is configured to penetrate the energy attenuator to inhibit the shaft from recoiling in the second direction. In various embodiments, the end section comprises a barbed fitting configured to enable the barbed fitting to penetrate the energy attenuator in the first direction and to inhibit extraction of the barbed fitting from the energy attenuator in the second direction. The end section may include a protrusion. The end section of the shaft may have a smaller cross-sectional dimension than a body of the shaft. In various embodiments, the shaft comprises a piston head configured to slide in fluid sealing engagement along interior walls of the housing, wherein the piston head divides the cavity into an annular power chamber and an anchoring chamber. The end section may extend from the piston head in the first direction into the anchoring chamber.

In various embodiments, the anti-recoil assembly further includes a spring-loaded locking pin configured to engage a shoulder of the shaft to provide redundant inhibition of the shaft recoiling in the second direction. In various embodiments, the second end portion of the housing comprises at least one of converging and diverging sidewalls such that at least a portion of the cavity at the second end portion comprises a conical shape. In various embodiments, the energy attenuator is floating within the cavity at the second end portion such that the energy attenuator is freely moveable within the cavity relative to the housing before the end section of the shaft penetrates the energy attenuator.

In various embodiments, the energy attenuator is coupled to an end section of the shaft, wherein in response to the energy attenuator impacting the second end portion of the housing, the energy attenuator is configured to deform to inhibit the shaft from recoiling in the second direction. In various embodiments, deformation of the energy attenuator may include at least one axial compression and radial expansion. For example, the second end portion of the housing comprises at least one of converging and diverging sidewalls such that at least a portion of the cavity at the second end portion comprises a conical shape, according to various embodiments. In response to the energy attenuator impacting the second end portion of the housing, the end section of the shaft is configured to penetrate further into the energy attenuator, according to various embodiments.

Also disclosed herein, according to various embodiments, is an ejection seat stability system configured to control seat pitch during an ejection event. The ejection seat stability system may include a stabilizing gyro configured to be mounted to an ejection seat, the stabilizing gyro comprising a pinion. Further, the ejection seat stability system may include a shaft comprising gear teeth configured to engage the pinion of the stabilizing gyro. Still further, the system may include a housing defining a cavity, the housing comprising a first end portion and a second end portion, wherein the shaft is disposed at least partially disposed within the cavity. The system may also include an actuator and an energy attenuator. The actuator may be configured to translate the shaft in a first direction, as defined from the first end portion to the second end portion, within the cavity of the housing to drive rotation of the pinion of the stabilizing gyroscope. The energy attenuator may be disposed within the cavity at the second end portion. In response to movement of the shaft in the first direction, the energy attenuator is configured to inhibit the shaft from recoiling in a second direction opposite the first direction, according to various embodiments.

In response to the movement of the shaft in the first direction, at least an end section of the shaft is configured to penetrate the energy attenuator to inhibit the shaft from recoiling in the second direction, according to various embodiments. In various embodiments, the energy attenuator is coupled to an end section of the shaft, wherein in response to the energy attenuator impacting the second end portion of the housing, the energy attenuator is configured to deform to inhibit the shaft from recoiling in the second direction.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

FIG. 3A is a cross-sectional view of an anti-recoil assembly in a pre-deployed state, with a shaft of the anti-recoil assembly having an end section that comprises a barbed fitting, in accordance with various embodiments;

FIG. 3B is a cross-sectional view of the anti-recoil assembly of FIG. 3A in a deployed state, in accordance with various embodiments;

FIG. 4A is a cross-sectional view of an anti-recoil assembly in a pre-deployed state, with a shaft of the anti-recoil assembly having an end section that comprises a protrusion, in accordance with various embodiments;

FIG. 4B is a cross-sectional view of the anti-recoil assembly of FIG. 4A in a deployed state, in accordance with various embodiments;

FIG. 5A is a cross-sectional view of an anti-recoil assembly in a pre-deployed state, with an energy attenuator coupled to an end section of the shaft and a housing having a converging second end portion, in accordance with various embodiments;

FIG. 5B is a cross-sectional view of the anti-recoil assembly of FIG. 5A in a deployed state, in accordance with various embodiments;

FIG. 6A is a cross-sectional view of an anti-recoil assembly in a pre-deployed state, with an energy attenuator coupled to an end section of the shaft and a housing having a diverging second end portion, in accordance with various embodiments; and FIG. 6B is a cross-sectional view of the anti-recoil assembly of FIG. 6A in a deployed state, in accordance with various embodiments.

Figure 1:
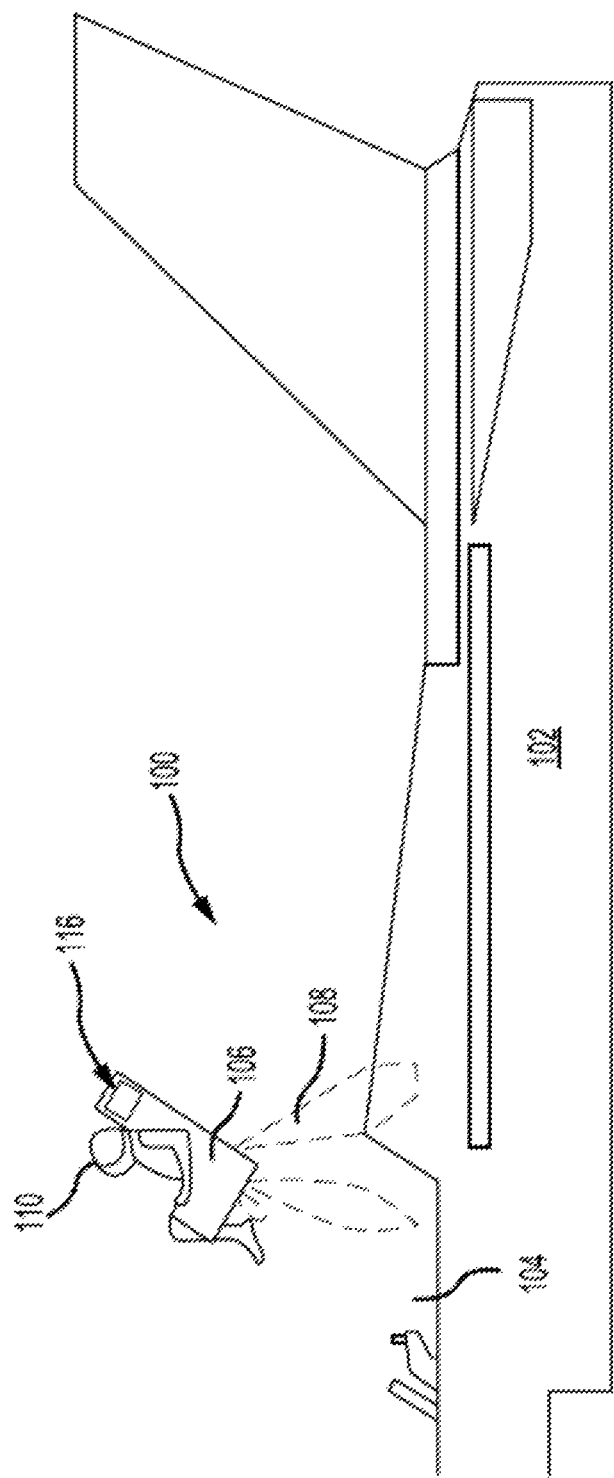
FIG. 1 is a schematic view of an aircraft ejection event, in accordance with various embodiments.

The subject matter of the present disclosure is particularly pointed out and distinctly claimed in the concluding portion of the specification. A more complete understanding of the present disclosure, however, may best be obtained by referring to the detailed description and claims when considered in connection with the drawing figures.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein without departing from the spirit and scope of the disclosure. Thus, the detailed description herein is presented for purposes of illustration only and not of limitation.

Disclosed herein, according to various embodiments, an anti-recoil assembly configured to inhibit recoil of a shaft. As described in greater detail below, the anti-recoil assembly generally includes an energy attenuator that is configured to be penetrated by an end section of the shaft and/or impacted against a second end portion of a housing to inhibit recoil of the shaft. Although numerous details and examples are included herein pertaining to utilizing these concepts in conjunction with aircraft ejection systems, such as an ejection seat stability system, the present disclosure is not necessarily so limited, and thus aspects of the disclosed embodiments may be adapted for use in a variety of other one-stroke shaft implementations. As such, numerous applications of the present disclosure may be realized.

FIG. 1 is a schematic view of an aircraft ejection event, in accordance with various embodiments. FIG. 1 illustrates an aircraft ejection system 100, in accordance with various embodiments. The aircraft ejection system 100 may be installed in an aircraft 102 to safely expel an ejection seat 106 and a user 110 of the ejection seat 106 from a cockpit 104 of the aircraft 102. The ejection seat 106 may be urged from the cockpit 104 by a propulsion system 108. The aircraft ejection system 100 may include a parachute 116. In various embodiments, prior to deployment of the parachute 116, a portion of the parachute 116 may be stored within the ejection seat 106.

Figure 2A:
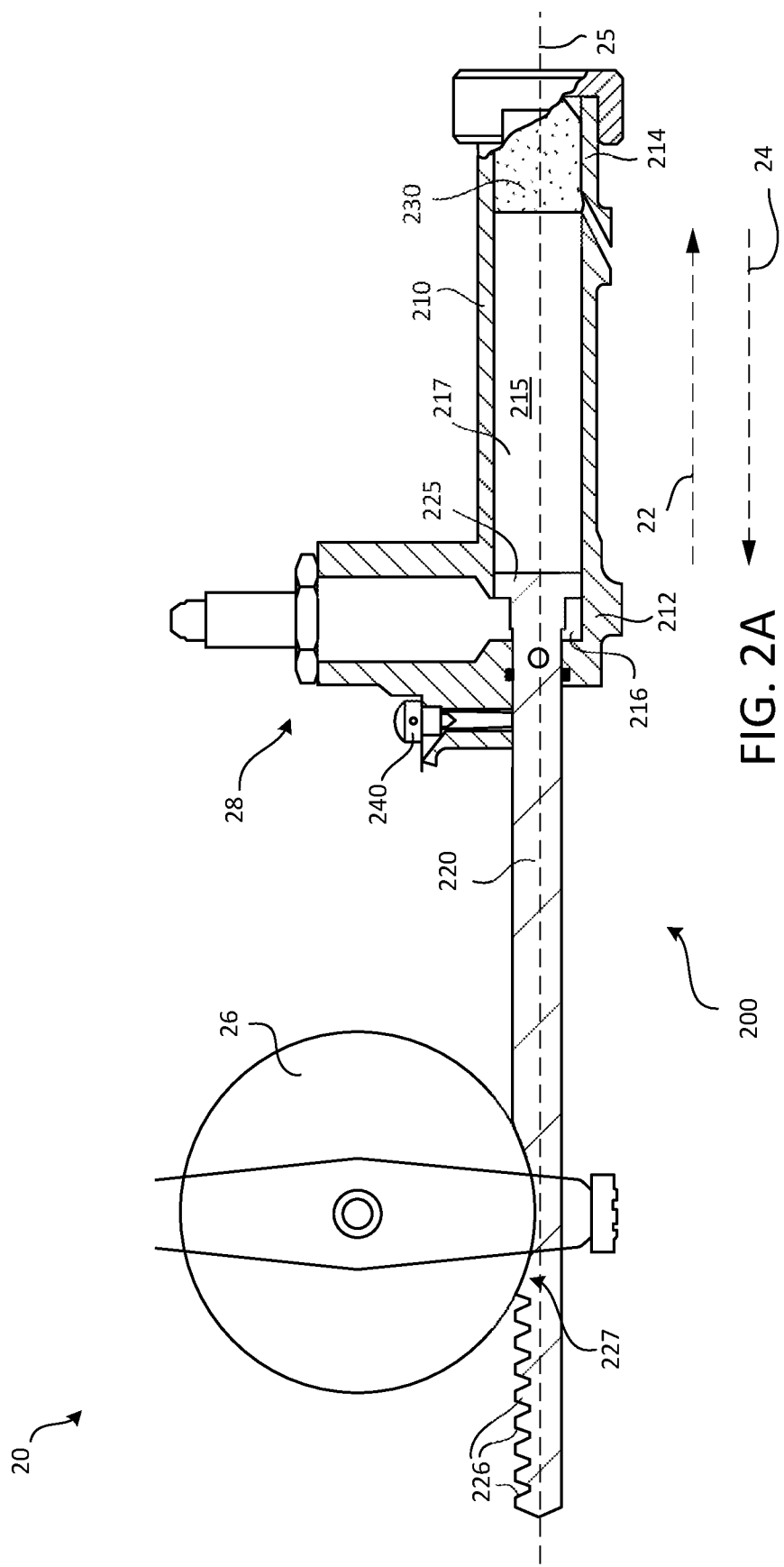
FIG. 2A is a cross-sectional view of an ejection seat stability system, in accordance with various embodiments.

In various embodiments, and with reference to FIGS. 1 and 2A, an ejection seat stability system 20 may be provided with the aircraft ejection system 100. That is, an ejection seat stability system 20 may be mounted to an ejection seat 106, and may generally include a gyro 26 that operably provides pitch stability and/or orientation stability to the ejection seat 106 during an ejection event. The ejection seat stability system 20 may be mounted on a back side of the ejection seat 106 or underneath the ejection seat 106.

In various embodiments, the ejection seat stability system 20 includes the stabilizing gyro 26, an actuator 28, and an anti-recoil assembly 200. The anti-recoil assembly 200 is described in greater detail below, but the anti-recoil assembly 200 generally includes a shaft 220 that is configured to spin up the stabilizing gyro 26, according to various embodiments. Said differently, the shaft 220 may comprise gear teeth 226 that are configured to engage a pinion 227 of the stabilizing gyro 26. The actuator 28 drives translation of the shaft 220 in a first direction 22, and this linear translation drives rotation of the pinion 227 of the stabilizing gyro 26 (e.g., a rack-and-pinion assembly), according to various embodiments.

Figure 2B:
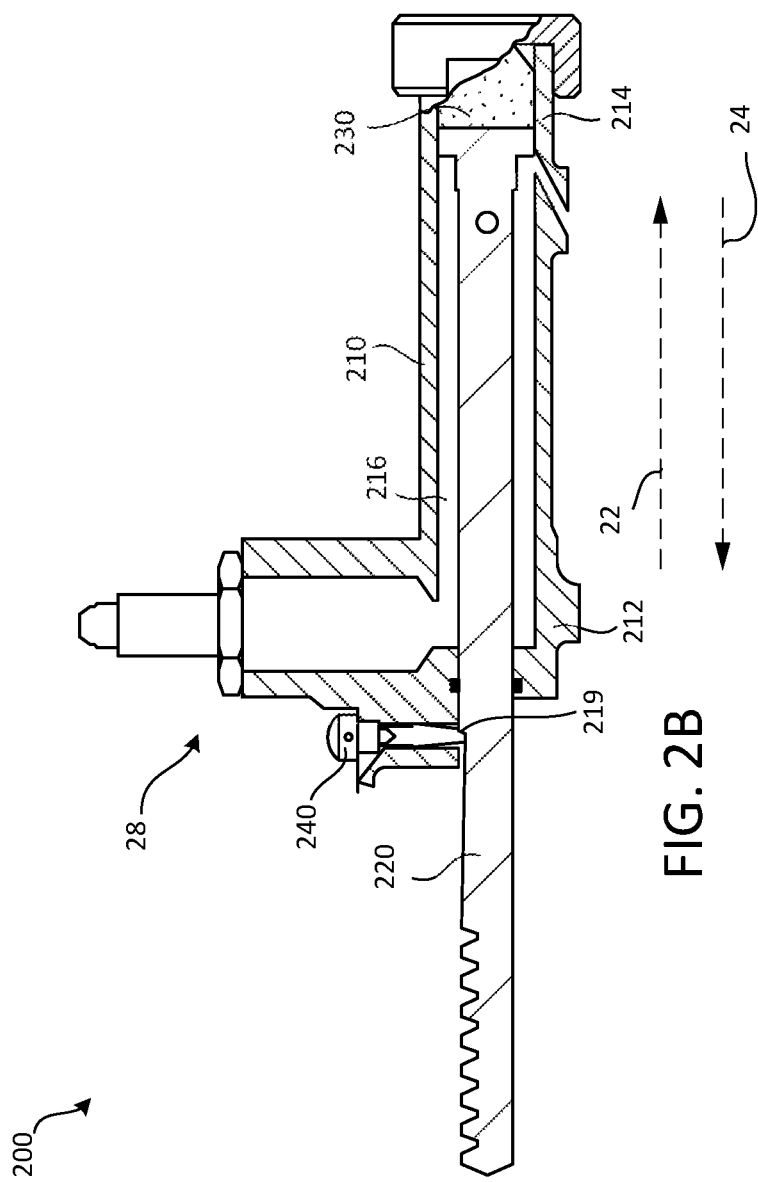
FIG. 2B is a cross-sectional view of an anti-recoil assembly, in accordance with various embodiments.

In various embodiments, and with reference to FIGS. 2A and 2B, the anti-recoil assembly 200 includes, in addition to the shaft 220, a housing 210 defining a cavity 215 (e.g., a central cavity) and an energy attenuator 230. The housing 210 may have a first end portion 212 and a second end portion 214, and the shaft 220 may be at least partially disposed within the cavity 215 of the housing 210. As mentioned above, the shaft 220 may be configured to move/translate within the cavity 215 in a first direction 22, the first direction 22 being defined as a direction extending from the first end portion 212 of the housing 210 to the second end portion 214 of the housing 210 along a longitudinal centerline axis 25 of the shaft 220.

To initiate linear translation/movement of the shaft 220 in the first direction, the actuator 28 includes (or is coupled in fluid receiving communication with) a source of pressurized fluid, such as a pressurized air cartridge, according to various embodiments. The actuator 28 may be configured, upon activation, to direct an expanding gas, such as a combustion gas or gas from the propulsion system 108 (FIG. 1), to the anti-recoil assembly 200 to propel the shaft 220. For example, the shaft 220 may include a piston head 225 configured to slide in fluid sealing engagement along interior walls of the housing 210. The piston head 225 may divide the cavity 215 into an annular power chamber 216 and an anchoring chamber 217. The anchoring chamber 217, which may also be described as the region of the cavity 215 at the second end portion 214 of the housing 210, may generally house the energy attenuator 230. As described in greater detail below, in response to movement of the shaft 220 in the first direction 22, the energy attenuator 230 is configured to inhibit the shaft 220 from recoiling in a second direction 24 opposite the first direction 22, according to various embodiments. The anchoring chamber 217 may also include a vent to allow for air/gas from the cavity 215 to exit.

In various embodiments, the energy attenuator 230 comprises a material that is configured to deform in response to the energy attenuator 230 being compressed between the shaft 220 and the second end portion 214 of the housing. In various embodiments, the deformation experienced by the energy attenuator 230 is irreversible and absorbs the kinetic energy of the linear movement of the shaft 220. Without the energy attenuator 230, the shaft 220 would be susceptible to recoil, which would result in the shaft 220 essentially bouncing off of the second end portion 214 of the chamber 215 and moving back toward the stabilizing gyro 26 in the second direction 24. The remaining figures show various shaft interfaces and housing configurations that help to facilitate recoil inhibition, as described in greater detail below. As shown through the figures, the "A" drawings show the anti-recoil assembly 200 in pre-deployed state with the shaft 220 engaged with the pinion/gyro 26 and the energy attenuator 230 in a non-deformed state and the "B" drawings show the anti-recoil assembly 200 in a deployed state with the shaft 220 having moved in the first direction 22 to compress and/or deform the energy attenuator 230.

In various embodiments, the energy attenuator 230 is made from a material that is capable of absorbing large amounts of kinetic energy, such as metallic materials and composite materials. For example, the energy attenuator 230 may have a honeycomb structure that is configured to be crushed and/or collapse to attenuate the force from the linear motion of the shaft 220. The energy attenuator may be fixed in place within the cavity 215 at or adjacent to the second end portion 214 of the housing. In various embodiments, the energy attenuator is floating within the cavity at or adjacent to the second end portion such that the energy attenuator is freely moveable within the cavity relative to the housing.

In various embodiments, the anti-recoil assembly may further include a spring-loaded locking pin mechanism 240 that is configured to engage a shoulder 219 of the shaft 220 once the shaft 220 has traveled far enough in the first direction 22. Engagement of the spring-loaded pin against the shoulder 219 of the shaft 220 may facilitate retention of the shaft 220, and thus may provide redundant recoil inhibition.

In various embodiments, and with reference to FIGS. 3A and 3B, the shaft 320 of the anti-recoil assembly 300 includes an end section 323. The end section 323 is the terminating portion of the shaft 320 that extends from the shaft 320 towards the second end portion 214 and/or the energy attenuator 230 disposed therein. For example, the end section 323 may be a fitting or protrusion that extends from the piston head in the first direction 22 into the anchoring chamber 217. In response to movement of the shaft 320 in the first direction 22, at least the end section 323 of the shaft 320 is configured to penetrate the energy attenuator 230 to inhibit the shaft 320 from recoiling in the second direction 24. The end section 323 may be coupled to the shaft 320, or the end section 323 may be an integral or unitary extension of the shaft 320 (e.g., the shaft 320 and the end section 323 may be a monolithic structure).

In various embodiments, the end section 323 comprises a barbed fitting. The barbed fitting may allow for the end section 323 to penetrate the energy attenuator 230 in the first direction 22 but may resist the subsequent reverse extraction of the end section 323 from the energy attenuator 230, thus helping to inhibit shaft recoil. In various embodiments, and as described in greater detail below, the energy attenuator 230 may experience axial or radial deformation, and this deformation may prevent the energy attenuator 230 from moving within the cavity 215, thus securing and/or retaining the energy attenuator 230 and the shaft 320, with its end section 323 lodged within the energy attenuator 230, in the deployed/anchored state.

In various embodiments, and with reference to FIGS. 4A and 4B, the end section 423 of the shaft 420 of the anti-recoil assembly 400 may be a simple protrusion extending from the shaft 420. In various embodiments, the end section 423 may have surface features (e.g., a roughed surface) that may facilitate secure and substantially irreversible mechanical retention between the end section 423 and the energy attenuator 230. In various embodiments, the end section 423 of the shaft 420 has a smaller-cross sectional dimension than a body of the shaft 420.

In various embodiments, and with reference to FIGS. 5A and 5B, the energy attenuator 530 is coupled to an end section 523 of the shaft 520 of the anti-recoil assembly 500. That is, the energy attenuator 530 may be already attached to the shaft 520 in the pre-deployed state. Thus, the deformation of the energy attenuator 530 may be primarily in response to the energy attenuator 530 moving into contact with and impacting the second end portion 514 of the housing 510, thus inhibiting the shaft 520 from recoiling in the second direction 24. In various embodiments, the second end portion 514 of the housing 510 may be shaped and configured to allow for a desired deformation of the energy attenuator 530. That is, the sidewalls of the second end portion 514 of the housing 510 may guide and/or direct the deformation of the energy attenuator 530, thus enabling the energy attenuator 530 to undergo desired axial compression and/or radial expansion. For example, the second end portion 514 of the housing 510 may have converging (as defined in the first direction 22) sidewalls such that at least a portion of the cavity at the second end portion 514 of the housing 510 has a conical or frustoconical shape.

In various embodiments, and with reference to FIGS. 6A and 6B, the energy attenuator 630 is coupled to an end section 623 of the shaft 620 of the anti-recoil assembly 600, similar to the embodiment shown in FIGS. 5A and 5B. In various embodiments, the second end portion 614 of the housing 510 may have diverging (as defined in the first direction 22) sidewalls such that at least a portion of the cavity at the second end portion 614 of the housing 610 has a conical or frustoconical shape. As seen in FIG. 6B, the energy attenuator 630 may experience radial expansion as it deforms, and this radial expansion may further improve the retention of the energy attenuator 630 and the shaft 620 in the anchored/deployed state, thus preventing or at least inhibiting recoil of the shaft 620.

In various embodiments, as seen in the transition from FIG. 5A to 5B and the transition from FIG. 6A to 6B, the end section 523/623 of the shaft 520/620 may penetrate further into the energy attenuator 530/630 in response to the energy attenuator 530/630 impacting the second end portion 514/614 of the housing 510/610. Said differently, the energy attenuator may be affixed to the end section of the shaft in the pre-deployed state, but a gap may be defined between the piston head and the energy attenuator. Once the shaft is launched in the first direction and as the energy attenuator is deformed, this gap may diminish as the end piece penetrates further into the energy attenuator and/or as the energy attenuator collapses around the end piece to occupy the gap. Such a configuration may provide various energy dissipation/absorption benefits, and may thus further facilitate recoil prevention.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure.

The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. All ranges and ratio limits disclosed herein may be combined.

Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

The steps recited in any of the method or process descriptions may be executed in any order and are not necessarily limited to the order presented. Furthermore, any reference to singular includes plural embodiments, and any reference to more than one component or step may include a singular embodiment or step. Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

Any reference to attached, fixed, connected or the like may include permanent, removable, temporary, partial, full and/or any other possible attachment option. Additionally, any reference to without contact (or similar phrases) may also include reduced contact or minimal contact. In the above description, certain terms may be used such as "up," "down," "upper," "lower," "horizontal," "vertical," "left," "right," and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Surface shading lines may be used throughout the figures to denote different parts or areas but not necessarily to denote the same or different materials. In some cases, reference coordinates may be specific to each figure.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An anti-recoil assembly comprising:
   a housing defining a cavity, the housing comprising a first end portion and a second end portion;
   a shaft at least partially disposed within the cavity, the shaft configured to move within the cavity in a first direction from the first end portion to the second end portion; and
   an energy attenuator disposed within the cavity at the second end portion;
   wherein in response to movement of the shaft in the first direction, the energy attenuator is configured to inhibit the shaft from recoiling in a second direction opposite the first direction, and
   wherein the energy attenuator is coupled to an end section of the shaft, wherein in response to the energy attenuator impacting the second end portion of the housing, the energy attenuator is configured to deform to inhibit the shaft from recoiling in the second direction.

2. The anti-recoil assembly of claim 1, wherein in response to the movement of the shaft in the first direction, at least an end section of the shaft is configured to penetrate the energy attenuator to inhibit the shaft from recoiling in the second direction.

3. The anti-recoil assembly of claim 2, wherein the end section comprises a barbed fitting configured to enable the barbed fitting to penetrate the energy attenuator in the first direction and to inhibit extraction of the barbed fitting from the energy attenuator in the second direction.

4. The anti-recoil assembly of claim 2, wherein the end section comprises protrusion.

5. The anti-recoil assembly of claim 4, wherein the end section has a smaller cross-sectional dimension than a body of the shaft.

6. The anti-recoil assembly of claim 2, wherein the shaft comprises a piston head configured to slide in fluid sealing engagement along interior walls of the housing, wherein the piston head divides the cavity into an annular power chamber and an anchoring chamber.

7. The anti-recoil assembly of claim 6, wherein the end section extends from the piston head in the first direction into the anchoring chamber.

8. The anti-recoil assembly of claim 1, further comprising a spring-loaded locking pin configured to engage a shoulder of the shaft to provide redundant inhibition of the shaft recoiling in the second direction.

9. The anti-recoil assembly of claim 1, wherein the second end portion of the housing comprises at least one of converging and diverging sidewalls such that at least a portion of the cavity at the second end portion comprises a conical shape.

10. The anti-recoil assembly of claim 1, wherein the energy attenuator is floating within the cavity at the second end portion such that the energy attenuator is freely moveable within the cavity relative to the housing before an end section of the shaft penetrates the energy attenuator.

11. The anti-recoil assembly of claim 1, wherein deformation of the energy attenuator comprises at least one axial compression and radial expansion.

12. The anti-recoil assembly of claim 1, wherein the second end portion of the housing comprises at least one of converging and diverging sidewalls such that at least a portion of the cavity at the second end portion comprises a conical shape.

13. The anti-recoil assembly of claim 1, wherein in response to the energy attenuator impacting the second end portion of the housing, the end section of the shaft is configured to penetrate further into the energy attenuator.

14. An ejection seat stability system configured to control seat pitch during an ejection event, the ejection seat stability system comprising:
a stabilizing gyro configured to be mounted to an ejection seat, the stabilizing gyro comprising a pinion;
a shaft comprising gear teeth configured to engage the pinion of the stabilizing gyro;
a housing defining a cavity, the housing comprising a first end portion and a second end portion, wherein the shaft is disposed at least partially disposed within the cavity;
an actuator configured to translate the shaft in a first direction, as defined from the first end portion to the second end portion, within the cavity of the housing to drive rotation of the pinion of the stabilizing gyro; and
an energy attenuator disposed within the cavity at the second end portion;
wherein in response to movement of the shaft in the first direction, the energy attenuator is configured to inhibit the shaft from recoiling in a second direction opposite the first direction, and
wherein the energy attenuator is coupled to an end section of the shaft, wherein in response to the energy attenuator impacting the second end portion of the housing, the energy attenuator is configured to deform to inhibit the shaft from recoiling in the second direction.

15. The ejection seat stability system of claim 14, wherein in response to the movement of the shaft in the first direction, at least an end section of the shaft is configured to penetrate the energy attenuator to inhibit the shaft from recoiling in the second direction.

16. The ejection seat stability system of claim 14, wherein the shaft comprises a piston head configured to slide in fluid sealing engagement along interior walls of the housing, wherein the piston head divides the cavity into an annular power chamber and an anchoring chamber.

17. The ejection seat stability system of claim 16, wherein the actuator comprises a source of pressurized fluid, wherein in response to activation of the actuator, pressurized fluid from the source of pressurized fluid is directed to the annular power chamber to drive the shaft in the first direction.

18. An ejection seat stability system configured to control seat pitch during an ejection event, the ejection seat stability system comprising:
a stabilizing gyro configured to be mounted to an ejection seat, the stabilizing gyro comprising a pinion;
a shaft comprising gear teeth configured to engage the pinion of the stabilizing gyro;
a housing defining a cavity, the housing comprising a first end portion and a second end portion, wherein the shaft is disposed at least partially disposed within the cavity;
an actuator configured to translate the shaft in a first direction, as defined from the first end portion to the second end portion, within the cavity of the housing to drive rotation of the pinion of the stabilizing gyro; and
an energy attenuator disposed within the cavity at the second end portion;
wherein in response to movement of the shaft in the first direction, at least an end section of the shaft is configured to penetrate the energy attenuator to inhibit the shaft from recoiling in a second direction opposite the first direction, and
wherein the energy attenuator is coupled to an end section of the shaft, wherein in response to the energy attenuator impacting the second end portion of the housing, the energy attenuator is configured to deform to inhibit the shaft from recoiling in the second direction.

* * * * *